Figure 1:
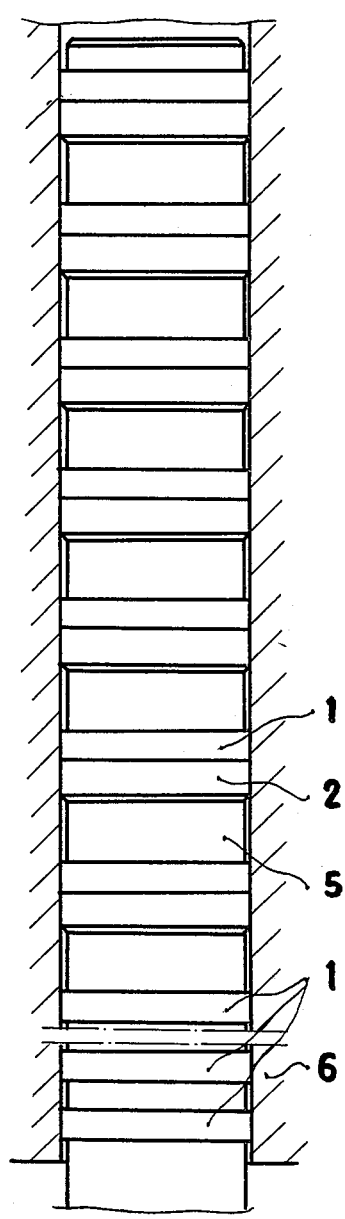

United States Patent [19]

Kulig

[11] 3,971,298

[45] July 27, 1976

[54] PISTON ASSEMBLY WITH COMPRESSION AND GUIDING RINGS

[75] Inventor: Stanisław Kulig, Krakow, Poland

[73] Assignee: Oswdek Badawczo-Rozwojowy Przemysłu Budowy Chemicznych Cebea, Krakow, Poland

[22] Filed: May 7, 1974

[21] Appl. No.: 467,838

[30] Foreign Application Priority Data

May 10, 1973 Poland .................................. 162453

[52] U.S. Cl. ................................. 92/248; 92/252; 277/58; 277/170
[51] Int. Cl.² ........................ F16J 1/00; F16J 9/20
[58] Field of Search ............ 92/250, 251, 257, 259, 92/252, 248, 249; 277/170, 188, 198, 58, 190, 125

[56] References Cited
UNITED STATES PATENTS

| 807,470 | 12/1905 | Kane | 277/170 X |
|---|---|---|---|
| 1,527,535 | 2/1925 | Bockwitz | 277/170 |
| 3,315,881 | 4/1967 | Halpin et al. | 277/58 |
| 3,522,950 | 8/1970 | Schneck, Jr. | 277/170 |
| 3,658,348 | 4/1972 | Nink | 277/58 |

FOREIGN PATENTS OR APPLICATIONS

| 216,214 | 5/1924 | United Kingdom | 277/188 |
|---|---|---|---|
| 284,133 | 1/1928 | United Kingdom | 277/188 |
| 552,296 | 3/1943 | United Kingdom | 277/170 |
| 619,435 | 3/1949 | United Kingdom | 277/188 |

Primary Examiner—Irwin C. Cohen
Attorney, Agent, or Firm—Haseltine, Lake & Waters

[57] ABSTRACT

A piston assembly adapted for use in nonlubricated high pressure compressors, comprising a piston having a plurality of peripheral grooves therein with a ring assembly in each groove constituted of one seal ring and one guide ring in a common groove. The guide ring is behind the seal ring in a direction away from the compression end and has a surface remote from the compression end which is at least partially conical in shape and abuts against a corresponding conical shaped surface of the associated groove. The seal ring and guide ring abut along planar surfaces, the guide ring being made from non-metallic material such as a carbon-graphite material providing higher resistance to shape deformation then the material of the seal ring which can be polytetrafluoroethylene. The guide ring thus prevents plastic deformation of the seal ring particularly at very high pressures of compressed gas.

3 Claims, 2 Drawing Figures

U.S. Patent  July 27, 1976  3,971,298

PISTON ASSEMBLY WITH COMPRESSION AND GUIDING RINGS

The invention relates to a piston assembly with compression and guiding rings, said assembly being designed for use in various piston machines and particularly for use in compressors operating without lubricants.

In the presently known and used piston assemblies operating in cylinders, the problem of blow-by of gases is always an acute problem, particularly in the zone of gaps between the ends of compression rings in compressors operating without lubricants, and because of considerable clearances between the piston and the cylinder, these clearances being required because of the specific character of operation of non-metallic piston rings, e.g. of polytetrafluoroethylene rings with fillers improving friction and wear characteristics of the ring. These clearances, which are several times greater than those used between the lubricated cylinder wall and a piston fitted with metallic rings and which often reach several millimeters, are very important for preventing contact between the piston skirt and the cylinder wall. A contact between the cylinder wall and the piston leads to mechanical damage of both the cylinder wall and piston rings, this contact damaging at the same time a film formed on the cylinder wall by the products of wear of non-metallic piston rings, said contact thus leading to the failure of compressor. The greater the clearance between the cylinder wall and the piston, the greater the allowance for wear of the guiding ring, and thus the longer the service life of this ring, but at the same time a greater clearance involves higher blow-by past the piston and higher losses in power.

Since a considerable clearance is required between the cylinder wall and the piston, the only promising method for reducing the blow-by past the piston seems to be by using suitably shaped compression ring gaps. There are many types of ring gaps used in engineering, such as overlapping gaps having rectangular or trapezoidal cross-sections, straight gaps or diagonal gaps etc. It is also recommended that in order to reduce the blow-by to a minimum, the gaps of the compression rings should be spaced around the circumference of the piston so that they are at an angle of 180° in relation to the gaps of neighboring guiding rings.

The compression rings with overlapping gaps and trapezoidal in cross-section are expensive in production and the blow-by preventing effect of such rings is barely sufficient.

There are also constructions used where compression rings are assembled in pairs in a single ring groove, the gaps of these rings being suitably spaced around the circumference of the piston.

The guiding rings, namely the rings which are aligning the piston in the cylinder bore, are made as split or non-split rings and are installed in individual grooves whose shape is different from that of the compression ring grooves.

In order to secure that the inner faces of split guiding rings adhere to the bottom faces of ring grooves, either grooves which are trapezoidal in cross-section have to be used, or special circumferential or radial grooves have to be used in guiding rings, these grooves averting loads on guiding rings in the way the compression rings are loaded.

Since the guiding rings are installed in grooves which are different from the grooves of compression rings, they usually neither reduce the blow-by in the zone of the compression ring gaps, these gaps increasing along with the wear of compression rings, nor do they improve performance of the compression rings, particularly having no effect whatever on reduction of plastic deformation of the faces of the compression rings.

The blow-by induces high losses in power, particularly at compression of gases to a pressure of the order of several kgs/sq.cm., and in certain cases the designed working parameters, particularly the pressure and operating efficiency, are difficult to obtain.

An object of the present invention is to obviate or mitigate the above described imperfections, and the engineering problem involved in the present invention is that of developing a piston assembly with compression and guiding rings of a new construction providing a high reduction of blow-by, and preventing power losses in operation.

This object has been attained in our invention which consists in that either the whole or the part of the face of each guiding ring is in direct contact with a compression ring installed in a common groove.

The inner face of a single- or multi-segment guiding ring is made in the shape of a circular cone whose generatrix is a straight line, or may consist of straight and curved lines, said inner face adhering to the bottom face of the ring groove and being a mirror reflection of said bottom face.

In its cross-section the ring groove is similar to the cross-section of the guiding and compression ring.

The compression ring which is in contact with the guiding ring is installed in the top ring groove or grooves of the piston at the compression side of the cylinder, and the remaining compression rings belonging to the piston assembly but having no partner guiding rings are installed in separate ring grooves below the top ring groove or grooves.

Since compression rings adhere with their inner faces to the faces of the guiding rings, the gaps between the ends of the compression rings through which the blow-by occurs are blocked by the faces of the guiding rings, thus limiting the undesirable clearances.

Moreover, if, for example, the compression ring is made of the elastic strain susceptible polytetrafluoroethylene, said ring adhering to a guiding ring made, for instance, of a carbon-graphite material, then the face of the compression ring, adhering to the guiding ring, is secured against deformation particularly at high pressures of the compressed medium.

The guiding ring adhering with its conical face to the bottom face of the ring groove is secured against performing of any additional and undesirable work such as that of a compression ring, and it is pressed against the cylinder wall solely by its body forces.

Due to reduction of blow-by in the gap zones of the compression and guiding rings, the present invention particularly provides a considerable reduction of power losses in compressors operating without lubricants may be achieved.

Figure 2:
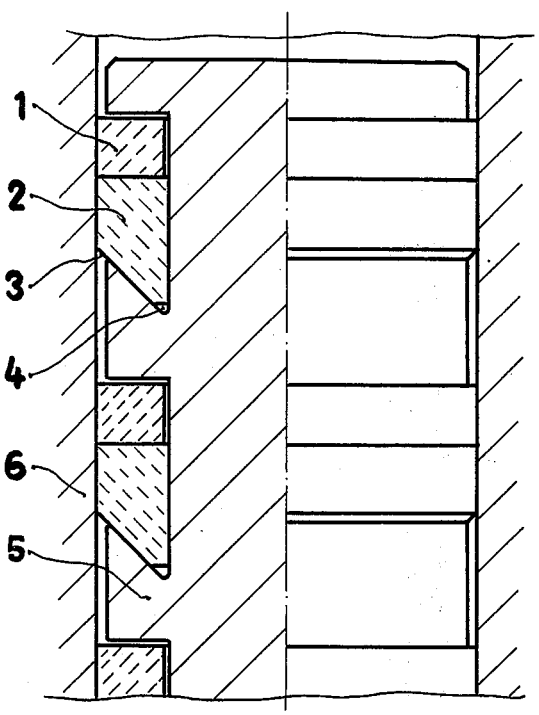

The piston assembly with compression and guiding rings, of the invention designed particularly for using in compressors operating without lubricants, will now be described by way of example with reference to the accompanying drawing in which:

FIG. 1 illustrates in a side view a piston assembly with compression and guiding rings; and FIG. 2 illustrates in a half section the part of the assembly at its compression end.

As it is seen in the drawing the piston assembly with compression and guiding rings includes single- or multi-segment compression rings 1, and single- or multi-segment guiding rings 2, faces 3 of the said guiding rings having the shape of a circular cone, each said guiding ring being in contact with a respective compression ring and being installed together with the said compression ring in a common groove 4 in piston 5 operating in a cylinder 6.

Since usually a piston assembly has more compression rings 1 than guiding rings 2, the compression rings which have no partner guiding rings are installed below groove 4 in ring grooves which are rectangular in cross-section.

What is claimed is:

1. A piston assembly adapted for use in non-lubricated high-pressure compressors, comprising a piston having a plurality of identical peripheral trapezoidally shaped cross-section grooves therein with each groove having a uniform annular base, a dual ring assembly in each groove protruding from said piston surface so as to contact the cylinder walls of said compressors, thus avoiding direct contact of the piston with said cylinder walls consisting of a seal ring of rectangular-shaped cross-section and a guide ring of largely trapezoidal cross-section with said guide ring seated behind the seal ring in a direction away from the compression end, said seal ring and guide ring in each groove having abutting planar surfaces, said guide ring having a surface opposite the one abutting with the seal ring which is at an acute angle relative to the base thereof to form the said trapezoidal cross-section and at least partially conical in shape, each peripheral groove in said piston having a corresponding wall defining an acute angle with the base of the groove to define an angularly shaped groove enabling said guide ring to hook into same and in abutment therewith, said guide ring being made from carbon-graphite material providing higher resistance to shape deformation than the seal ring said seal ring being made from polytetrafluoroethyle and both rings being more abradable than the material of the piston.

2. A piston assembly as claimed in claim 1 wherein said piston has an end face, a plurality of said ring assemblies being arranged in succession from the end face towards the other end of the piston, a plurality of seal rings being arranged individually in succession in respective grooves after said assemblies.

3. A piston assembly as in claim 1, where the trapezoidal cross section guide ring has the angular portion hooking into the piston wall slightly cut-off thus failing to completely fill the groove of the piston indentation to allow for wear of said ring in usage of the piston assembly.

* * * * *